United States Patent
Gray

[15] 3,655,235
[45] Apr. 11, 1972

[54] PASSENGER COACH FOR PICK-UP TRUCKS

[72] Inventor: Leonard W. Gray, 3414 Bryan Way, Louisville, Ky. 40220

[22] Filed: Apr. 30, 1970

[21] Appl. No.: 33,349

[52] U.S. Cl. ..................................................296/23 MC
[51] Int. Cl. ..............................................................B60p 3/38
[58] Field of Search ..................296/28 C, 10, 24, 99, 23 MC

[56] References Cited

UNITED STATES PATENTS

| | | | |
|---|---|---|---|
| 3,508,786 | 4/1970 | Colville | 296/99 |
| 3,485,522 | 12/1969 | Reinarts | 296/24 |

FOREIGN PATENTS OR APPLICATIONS

| | | | |
|---|---|---|---|
| 537,845 | 5/1922 | France | 296/10 |

*Primary Examiner*—Leo Friaglia
*Assistant Examiner*—John A. Pekar
*Attorney*—Norman L. Wilson, Jr.

[57] ABSTRACT

Conventional pick-up trucks can accommodate only three passengers. The so-called crew cab pick-up trucks have two seats and four doors. These trucks have room for six passengers, but it is impossible to convert from one to the other when additional cargo space is desired. Trucks in which the cargo bed is adapted for carrying passengers are known but these have uncomfortable seating arrangements with passengers either riding sideways, or riding with inadequate leg room. A passenger coach is provided herein for pick-up trucks which enables the passengers to sit in a front facing passenger car seat with adequate leg room. The coach is supported by the truck sides and it extends above the truck cab so that the passengers can see the road ahead.

7 Claims, 4 Drawing Figures

Patented April 11, 1972  3,655,235

INVENTOR
LEONARD W. GRAY
BY Norman L. Wilson Jr
HIS ATTORNEY

PASSENGER COACH FOR PICK-UP TRUCKS

BACKGROUND OF THE INVENTION

This invention relates to a removable passenger coach for a conventional pick-up truck, that is, a truck of the type having an open rear loading frame or truck bed with vertical side walls, a front wall, and a tail gate.

A full understanding of the background of this invention warrants a consideration of both the commercial approach to increasing the capacity, for passengers, of pick-up trucks, and the patent art, which apparently has not provided satisfactory or acceptable solutions to the problem of providing comfortable and pleasant seating for more than three passengers.

Commercially speaking there are two types of pick-up trucks. There are conventional, widely used trucks which accommodate only three people and have full cargo space. There are also trucks called crew cab pick-up trucks which have two seats and four doors. These trucks have room for six passengers. However cargo space is sacrificed.

It can be seen that from the commercial point of view only two choices are available in trucks. There are crew cab trucks with less cargo space than ordinary pick-up trucks, and there are conventional pick-up trucks which heretofore have been impractical when more than three people wish to travel together. The problem of accommodating additional passengers has been solved in the patent art. However cargo space is again sacrificed, and even these solutions have not attained commercial success.

Referring now to the patent art, in U.S. Pat. No. 3,093,403 it is pointed out that situations frequently arise where a truck must be used to carry workers or extra passengers beyond its normal seating capacity over substantial distances where comfort and safety are required. For such purposes the truck bed must be modified for passenger use. Trucks in which the truck cargo bed is provided with passenger carrying facilities are described in U.S. Pat. No. 3,093,403 and also in U.S. Pat. No. 3,390,913. In addition to the cab of the truck accommodations are provided for additional sportsmen, workers, or members of a family traveling with the driver.

In U.S. Pat. No. 3,093,403 a vehicle body is provided which can be inverted and positioned into a cargo carrying position. In this vehicle body the seats are mounted on pipe frames, extending longitudinally along the body. In vehicles of this type passengers have adequate leg room. However they cannot see forward, and in addition the seats are not as comfortable as regular automobile seats. There are also those who do not like riding sideways, particularly on long trips. Further all the cargo space is taken up by the unit.

In U.S. Pat. No. 3,390,913 a vehicle body for additional passengers is provided which overcomes the problems of having to ride sideways and of being unable to see out. A housing resembling a station wagon body is provided with passenger car type seats. Whereas the disadvantages encountered in U.S. Pat. No. 3,093,403 are overcome by the added passenger accommodations afforded by the invention of U.S. Pat. No. 3,390,913, the problem of adequate leg room and other problems have not been solved.

Thus there arise many situations in which a truck needs to be used as a passenger car, while being used as a truck soon thereafter. This is particularly true in agricultural areas where, for example, a single truck may have to be employed in various capacities. Also, the truck may have to shift from one function to another several times a day. There is also a need for trucks to haul bulky cargoes in addition to accommodating as many passengers as a passenger car. Trucks which are adapted for extra passengers, in most cases, are not capable of hauling at the same time. By the practice of this invention seven people can be accommodated in a modified conventional pick-up truck and yet one-half of the bed cargo space remains available. The modifying unit can still be easily and rapidly removed so that the truck once again is restored to its original passenger and large cargo capacity.

SUMMARY OF THE INVENTION

In accordance with the practice of this invention a passenger coach is provided for pick-up trucks which enables the passengers to sit in a front-facing passenger car seat with adequate leg room. These passengers can also see the highway in front of them. The passenger coach of this invention has a body portion and a base portion. The body portion is rectangular in cross section. The dimensions of the rectangular body portion are such that its longest dimension exceeds the distance between the truck walls so that the body portion can be mounted on the truck sides transversely across the truck bed and thereabove. Its shorter dimension is less than the length of the truck bed, and its height dimension is sufficient so that the upper end of the body portion extends above the truck cab. The base portion is integral with the bottom of the body portion enclosing its bottom end. This base portion consists of a flat section and a connected well section, the well portion being a transverse downwardly depending cubicle forming a footwell. A seat is mounted on the flat section facing the footwell. A door is provided in the side of the coach to receive passengers, and a windshield in the front of the coach in the upper portion thereof, above but facing the direction of travel above the truck cab, permits passengers to see the road ahead over the top of said cab. This invention thus provides a passenger coach adapted to be supported in the bed of a pick-up truck.

DETAILED DESCRIPTION OF THE INVENTION

One of the advantages of the passenger coach of this invention is that it does not occupy the entire truck bed. There remains space in the truck bed behind the coach for camping, hunting, or fishing gear or for workmen's tools. Normal passenger coaches of this invention take up only about one-half of the cargo space. Indeed the floor in the footwell of this passenger coach desirably stops short of the bed floor of the truck. In this embodiment there is also room beneath the coach for pipes, lumber, fishing rods, guns, and the like. Another advantage of the seating coach of this invention is that the seating space is wider than that in the truck cab itself. This means that a unit with one seat holds one more passenger than does the truck cab, a total of seven passengers.

Further objectives of the invention will appear as the description proceeds in the light of the accompanying drawings.

In the drawings

Figure 1:
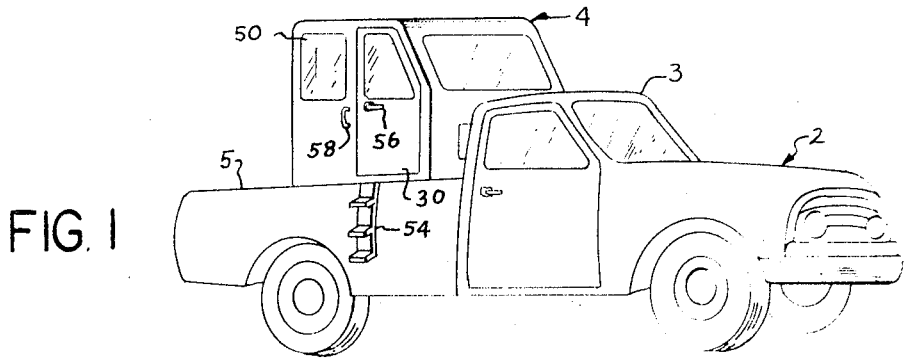
FIG. 1 is a perspective view of a coach body mounted on a conventional pick-up truck.

Referring now to FIG. 1 a truck 2 of the type generally known as a pick-up truck is shown having a standard enclosed cab 3 and an open loading platform or truck bed having side walls 5 extending rearwardly of cab 3. As will be described shortly, a passenger coach 4 is mounted behind cab 3. The coach contemplates an upper body section and a lower body section. The upper section includes two oppositely located sides 6 and 8 and two longer ends 10 and 12, forming a rectangular body portion. A roof 14 extends across the whole length of the body portion interconnecting the four top edges. The roof is thus integral with the four walls 6, 8, 10, and 12, forming an enclosed upper body portion.

Figure 2:
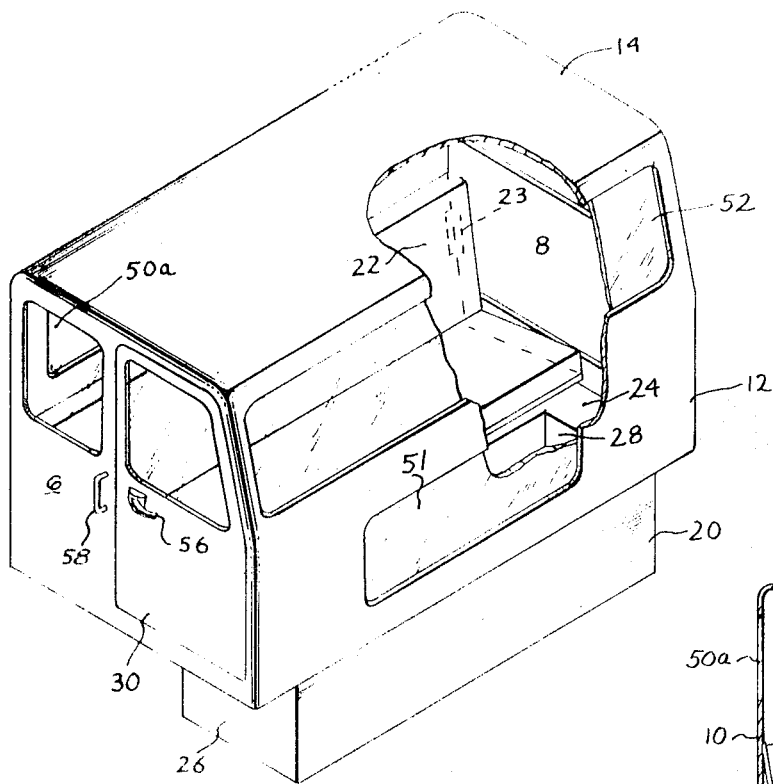
FIG. 2 is a perspective view of the coach body itself with a portion of the front wall broken away to show interior details.
Figure 3:
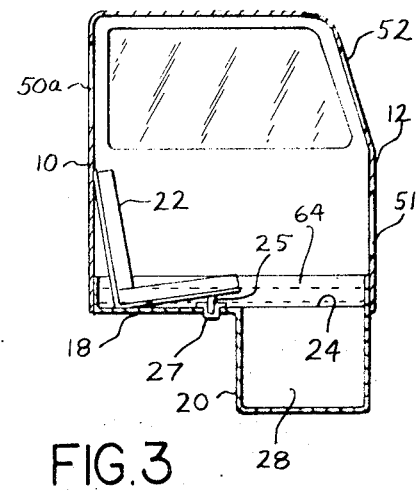
FIG. 3 is a sectional side elevation of the coach.

The coach lower body section is illustrated in FIG. 2 and FIG. 3. This enclosure contemplates a seat supporting platform 18 and a footwell 20. The seat support generally will be in the form of a flat surface or panel adapted to support a seat 22. The panel encloses the rearward portion of the bottom, considering the direction of travel, and hence end 12, to be the front. This seat support is actually a passenger coach floor with a footwell in its front end.

Seat 22 is installed on bottom panel 18 in any conventional manner. The seat can be mounted in a frame which in turn is secured to panel 18. The back rest can also be held by metal retaining strip 23, and the seat portion can be hinged to the back rest. the seat portion can be provided with legs 25 which seat in cups 27 so that the seat inclines toward the back at a suitable angle. The seat is installed so that it faces enclosure 20 which is integral with seat platform 18. This enclosure takes the shape of a box or cubicle extending downwardly below the level of seat platform 18 to form a footwell. The arrangement of cubicle or footwell 20 can best be seen in FIG. 2. Since the coach body extends beyond the sides of the truck bed, well 20 will be inset. Side flanges such as 24 are provided so that side 26 of footwell 20 is not in the same plane as side wall 6 of the passenger coach. If it were, the well would not fit between side walls 5 of the loading frame or cargo bed. Likewise the opposite wall 28 is not in the same plane as side wall 8. Desirably the well should be as wide as possible for a close fit between the loading frame sides, allowing for the fastening means holding the coach safely in place. Obviously panel 18 can be a floor to the body and a cut-out can be made in this floor to receive footwell 20.

Figure 4:
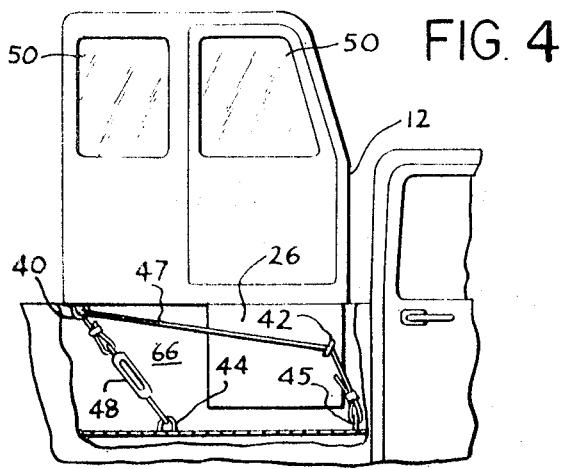
FIG. 4 is a side view partially in section showing how the coach is secured to the truck.

As can be seen from FIG. 2 the body portion of passenger coach 4 is such that side walls 6, and 8, extend beyond the truck's side walls. Preferably side walls 6 and 8 are about even with the sides of the truck, i.e., the outermost extremities of bed walls. Since coach 4 thus rests on the side walls of the loading frame adjacent truck cab 3, any of the various known means of rigidly and safely securing passenger coach 4 to the loading frame can be employed. One desirable means is illustrated in FIG. 4. This mode of fastening down the passenger coach entails the insertion of hooks 40 and 42 in the body of passenger coach 4 and eyes 44 and 45 in the loading frame. A steel or other strong cable 47 is then threaded through hooks 42 and 40 as shown and tightened by turnbuckle 48. The cable will be preset in clamp 49 so that it will be of a length such that turnbuckle 48 will tighten it sufficiently to hold down passenger coach 4. The turnbuckle is easily accessible since there is a cargo space 66 beneath the coach seat. Like means will be provided on the other side of coach 4.

A plurality of substantially conventional window units 50 are installed in sides 6 and 8 and in back 10 of passenger coach 4. In addition a windshield 52 is inserted in the front of the passenger coach extending from a point near the top of the coach down to about the top of truck cab 3. Preferably the front wall of passenger coach 4 will be tapered backwardly from a point immediately above the truck cab to top 14 as illustrated in FIGS. 1 and 2. All of these windows will be sealed to protect the inside of the coach from ingress of moisture, and the side windows can be made to be raised and lowered in the conventional manner if desired. In addition a lower front window 51 can be provided, located opposite the truck cab rear window, i.e., within the cab rear window area of the truck.

To permit entry into the interior of the coach a doorway 30 with a handle 56 is provided on at least one side of passenger coach 4 at the forward end thereof beside footwell 20. Preferably the door will be situated on the right or curb side of the truck and will be hinged at its front side. Conventional locks can be installed so that the door can be locked either from the inside or the outside. In order to permit easy access to the passenger coach, steps 54 are adapted to be mounted on the side of the truck as shown in FIG. 1. These can be removed when the coach is not in place. An assist handle 58 is secured to coach side 6 so that one entering or exiting from the truck can hold this handle while ascending steps 54. Another handle can be installed inside the door of the coach if desired so that a handle is available for each hand.

As can be seen from FIGS. 1 and 4, several advantages are realized by the passenger coach of this invention. In additional to leg room afforded by footwell 20, it will be noted (FIG. 4) that the coach does not rest on the truck bed floor. Consequently the footwell need not extend to the truck bed surface. It can thus be seen that besides storage space behind passenger coach 4 there is further space under the coach's seat area. There is also an area beneath the footwell for long items, some of which have been enumerated hereinbefore. It can be seen too that since passenger coach 4 is elevated by virtue of its placement on the walls of the cargo bed, windshield 52 is above truck cab 3. Passengers comfortably seated within passenger coach 4 have a clear view of the road ahead.

In the light of this invention various modifications will occur to those skilled in the art. Thus seat 22 can be constructed in the form of a fold-out bed 64 shown in dotted lines in FIG. 3. The resulting bed comfortably sleeps two persons. Seat 22 normally is held in place by leg 25 resting in reinforced hole 27. The seat will be hinged with a piano or similar hinging system adapted to open out to form the bed 64. The fold-out bed rests on well edges or side flanges 24. Many seats are available which can be converted into a bed.

In another modification a ventilation system can be provided to cooperate with the truck cab heating and air conditioning system so that passenger coach 4 will be heated or cooled. Thus, a weather-tight, flexible tunnel or sleeve can be provided for installation between the accessory cab window 51 and truck cab window 50a, allowing temperature equalization and passenger communication as in one common cab. Also, if desired, separate heating means and radios can be installed in passenger coach 4. In another embodiment the underside of that part of the coach which rests on the truck bed sides is provided with rubber stripping or coating. This coating will not only protect the truck finish but will also help prevent any possible movement of the passenger coach. Also a storage space can be provided under the seat which is accessible from the inside.

Any of the known methods now employed for making camper coaches can be utilized in the manufacture of the passenger coach of this invention. Hand lay up or spray up fiber glass molding techniques can be employed, or the coach can be otherwise fabricated of plastic, wood, or a light metal with a door in both sides if desired. These and other ramifications and variations will occur to those skilled in the art.

What is claimed is:

1. A passenger coach adapted to be carried on the bed of a truck of the pick-up type having an open top truck bed with a bottom and vertically positioned side walls located adjacent to and behind an enclosed cab comprising a passenger coach having (1) a rectangular body portion consisting of substantially vertical, oppositely disposed front and back walls, the front wall being the wall adjacent the cab, two substantially vertical, opposite side walls, and a roof interconnecting the top edges of said walls to form the body portion, (2) a base portion integral with the bottom of the body portion and enclosing its bottom end, the base portion consisting of a flat section and a connected well section, the flat section being a horizontal panel integral with the walls of the coach at the base and extending across the body portion bottom except where the well section depends therefrom, the well section being a transverse cubicle depending downwardly through a panel opening near the front wall, the cubicle being formed by downwardly extending walls and a connected floor at the bottom thereof, sized to fit between the truck sides, the walls being integral with the horizontal panel to form a footwell, (3) a seat mounted on said flat panel portion against the back wall and facing the footwell, (4) a door in one side of the coach to receive passengers, and (5) a windshield in the upper portion of the front wall of the coach facing forwardly; wherein the lengths of the front and back walls exceed the lengths of the side walls so that the coach body portion is substantially in cross section; wherein the lengths of the front and back walls exceed the distance between the truck side walls so that the coach body portion when mounted rests across the tops of the truck side walls, transversely across the truck bed and beyond the inside truck side walls, the coach body portion being above the truck side walls, with only the footwell extending therebelow; wherein the heights of the front and back walls are sufficient so that the upper end of the coach body portion is higher than the truck cab to allow the windshield in the front wall to extend above said truck cab; and wherein the height of the seat is such that the eye levels of passengers when seated are in line with the windshield, permitting them to look through the windshield and see ahead over the top of said cab.

2. The passenger coach of claim 1 having back and side windows.

3. The passenger coach of claim 1 having a door in each of its two sides.

4. The passenger coach of claim 1 having means adapted to accept a ladder placed along the side of the truck beneath the door.

5. The passenger coach of claim 1 having installed therein a seat which is convertible into a bed.

6. The passenger coach of claim 1 having means attached to the outside thereof permitting it to be rigidly secured to the truck loading frame.

7. The passenger coach of claim 1 having a window beneath the windshield therein located opposite the truck cab rear window.

* * * * *